United States Patent [19]
Araki

[11] Patent Number: 5,418,442
[45] Date of Patent: May 23, 1995

[54] METHOD OF AND AN APPARATUS FOR DETECTING AN ANGULAR VELOCITY OF A MOTOR AND FOR CONTROLLING THE SAME

[75] Inventor: Toru Araki, Itami, Japan

[73] Assignee: Mitsubishi Denki Kabushiki Kaisha, Tokyo, Japan

[21] Appl. No.: 221,453

[22] Filed: Apr. 1, 1994

Related U.S. Application Data

[62] Division of Ser. No. 788,162, Nov. 5, 1991, abandoned.

[30] Foreign Application Priority Data

Jan. 30, 1991 [JP]  Japan ................................. 3-009544

[51] Int. Cl.⁶ ...................... G06G 7/22; G05D 13/00
[52] U.S. Cl. ...................................... 318/651; 324/162
[58] Field of Search ............... 318/601, 603, 604, 640, 318/647, 651, 268, 271, 276, 480, 490; 388/842, 848, 933; 73/488, 493, 505, 510, 514, 517 R, 517 A, 518, 519; 324/160, 162, 178, 179

[56] References Cited

U.S. PATENT DOCUMENTS 4,095,547 6/1978 Benington .
4,220,084 9/1980 Maclean et al. .
4,566,327 1/1986 Rider ...................................... 73/510
4,958,125 9/1990 Jardine et al. ...................... 324/162
5,247,466 9/1993 Shimada et al. ................... 73/517 A

FOREIGN PATENT DOCUMENTS 3135743 5/1982 Germany .
4110374 10/1991 Germany .

*Primary Examiner*—Bentsu Ro
*Attorney, Agent, or Firm*—Oblon, Spivak, McClelland, Maier, & Neustadt

[57] ABSTRACT

The present invention is directed to a method of and an apparatus for detecting an angular velocity and a rotation angle of a rotary member and for controlling a motor disposed to drive the rotary member. In the present invention, first and second accelerations at first and second points of the rotary member are detected, respectively. The first and second accelerations are added. From the added value an angular velocity of the rotary member is calculated. A signal is generated representing the angular velocity and compared with predetermined control instructions. A control input is generated based upon this comparison, and the motor is controlled based upon the control input.

10 Claims, 9 Drawing Sheets

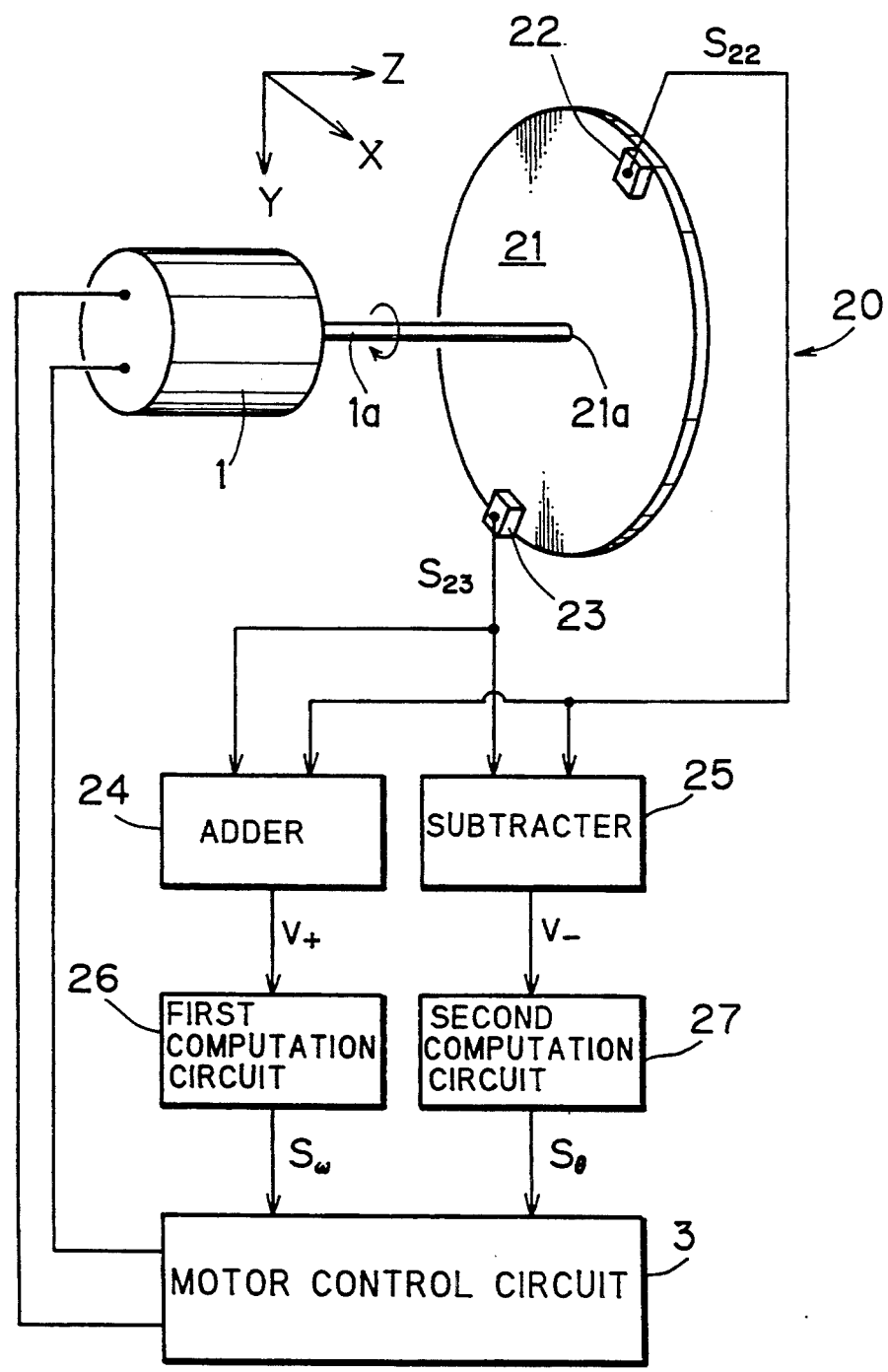

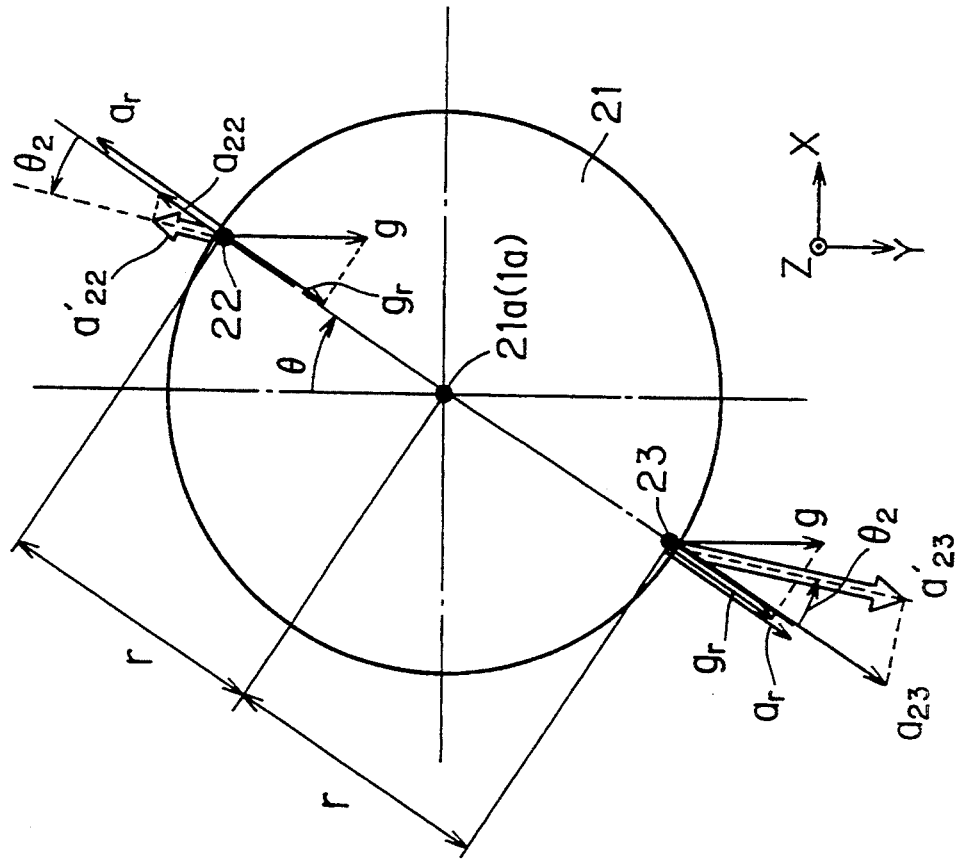
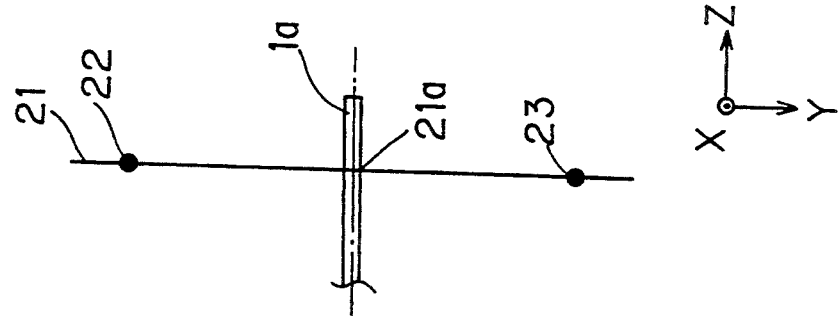

METHOD OF AND AN APPARATUS FOR DETECTING AN ANGULAR VELOCITY OF A MOTOR AND FOR CONTROLLING THE SAME

This application is a Division of application Ser. No. 07/788,162, filed Nov. 5, 1991, now abandoned.

BACKGROUND OF THE INVENTION

1. Field of the Invention

The present invention relates to a method of and an apparatus for detecting control information necessary for controlling a drive unit. In particular, the present invention relates to a method of and an apparatus for detecting an angular velocity and a rotation angle of a rotating object rotated by a drive unit or a rotary shaft of the same.

2. Description of the Prior Art

Rotary encoders are in popular use as this type of detection apparatus in the art. FIG. 1 is a block diagram of a motor (drive unit) control system employing a rotary encoder. In FIG. 1, a rotary encoder 10 includes a disk 11 connected to a rotary shaft 1a of a motor 1 and photo interruptors 12 and 13 each comprising a light emitter and a light receiver. In the disk 11, a plurality of slits 14 are provided along the periphery of the disk 11 at predetermined intervals. The disk 11 also includes a slit 15, the slit 15 being nearer a center 11a of the disk 11 than the slits 14 are. The photo interrupter 12 is positioned so as to correspond to the slits 14, while the interrupter 13 to the slit 15. When one of the slits 14 and the photo interrupter 12 align, a ray from the emitter impinges through the slit 14 upon the receiver within the photo interrupter 12, hence turning on the photo interrupter 12. The photo interrupter 13 is turned on in the same manner. Thus, when the disk 11 is in rotation, the photo interrupters 12 and 13 generate pulse signals $S_{12}$ and $S_{13}$ correspondingly to the rotation speed of the disk 11.

The slits 14 and 15 are assigned different functions. The slit 15 is to detect a zero reference point, the zero reference point being defined as the rotation angle of the rotary shaft 1a when the slit 15 is in the position of the photo interrupter 13. On the other hand, the function of the slits 14 is to detect a rotation speed of the rotation shaft 1a and a relative angle to the zero reference point. In other words, information contained in the pulse signals $S_{12}$ is about a rotation speed and a relative angle of the rotary shaft 1a, while information in the pulse signals $S_{13}$ is about the zero reference point.

The pulse signals $S_{12}$ and $S_{13}$ are fed to a motor control circuit 3 which controls operation of the motor 1 according to its received control instructions, or designated values. The motor control circuit 3 calculates a rotation angle and the number of revolutions of the rotary shaft 1a on the basis of the pulse signals $S_{12}$ and $S_{13}$, and then compares the calculated results with the control instructions and determines a control input for controlling the motor 1. Thus determined control input is then applied from the motor control circuit 3 to the motor 1 in order to maintain the motor 1 in an optimum appropriate operation.

In the rotary encoder 10, a rotation angle of the rotary shaft 1a is converted into a digital signal as explained above. Thus, the number of the slits have influence upon performance, resolution above all, of the rotary encoder 10. Although the rotary encoder 10, including the disk 11 in which a small number of the slits are provided, has poor performance, the performance thereof can be simply improved by providing more slits. However, there is a limit; naturally, the number of the slits cannot be endlessly increased. The rotary encoder 10 further has a problem that it is difficult to perform precise moment-by-moment detection of the rotary angle of the rotary shaft 1a. Therefore, the motor control circuit 3 cannot control the motor 1 on the basis of the digital signal from the rotary encoder 10.

SUMMARY OF THE INVENTION

The present invention is directed to a method of detecting an angular velocity of a rotary member, comprising the steps of: detecting first and second accelerations at first and second points of the rotary member, respectively; adding the first and second accelerations, to thereby obtain an added value; and calculating an angular velocity of the rotary member on the basis of the added value.

The present invention is also directed to a method of detecting a rotary angle of a rotary member, comprising the steps of: detecting first and second accelerations at a first and a second points of the rotary member, respectively; subtracting the first acceleration from the second acceleration, to thereby obtain a subtracted value; and calculating a rotation angle of the rotary member on the basis of the subtracted value.

The present invention is also directed to an apparatus for detecting control information, comprising: rotary member; first and second sensor for detecting first and a second accelerations at a first and a second points of the rotary member, respectively; an adder for adding the first and second accelerations to obtain an added value; and a first computation unit for calculating an angular velocity of the rotary member on the basis of the added value.

The present invention is also directed an apparatus for detecting control information, comprising: a rotary member; a first and a second sensor for detecting first and second accelerations at first and second points of the rotary member, respectively; a subtracter for subtracting the first acceleration from the second acceleration to obtain a subtracted value; and a second computation unit for calculating a rotation angle of the rotary member on the basis of the subtracted value.

Accordingly, the object of the present invention is to provide a method of and an apparatus for usually and accurately detecting an angular velocity of a rotary member.

Another object of the present invention is to provide a method of and an apparatus for usually and accurately detecting a rotation angle of a rotary member.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram of a motor control system employing an apparatus for detecting control information according to a first embodiment of the present invention;

FIGS. 5A and 5B show acceleration acting on acceleration sensors according to a third embodiment of the present invention;

DESCRIPTION OF THE PREFERRED EMBODIMENTS

Figure 1:
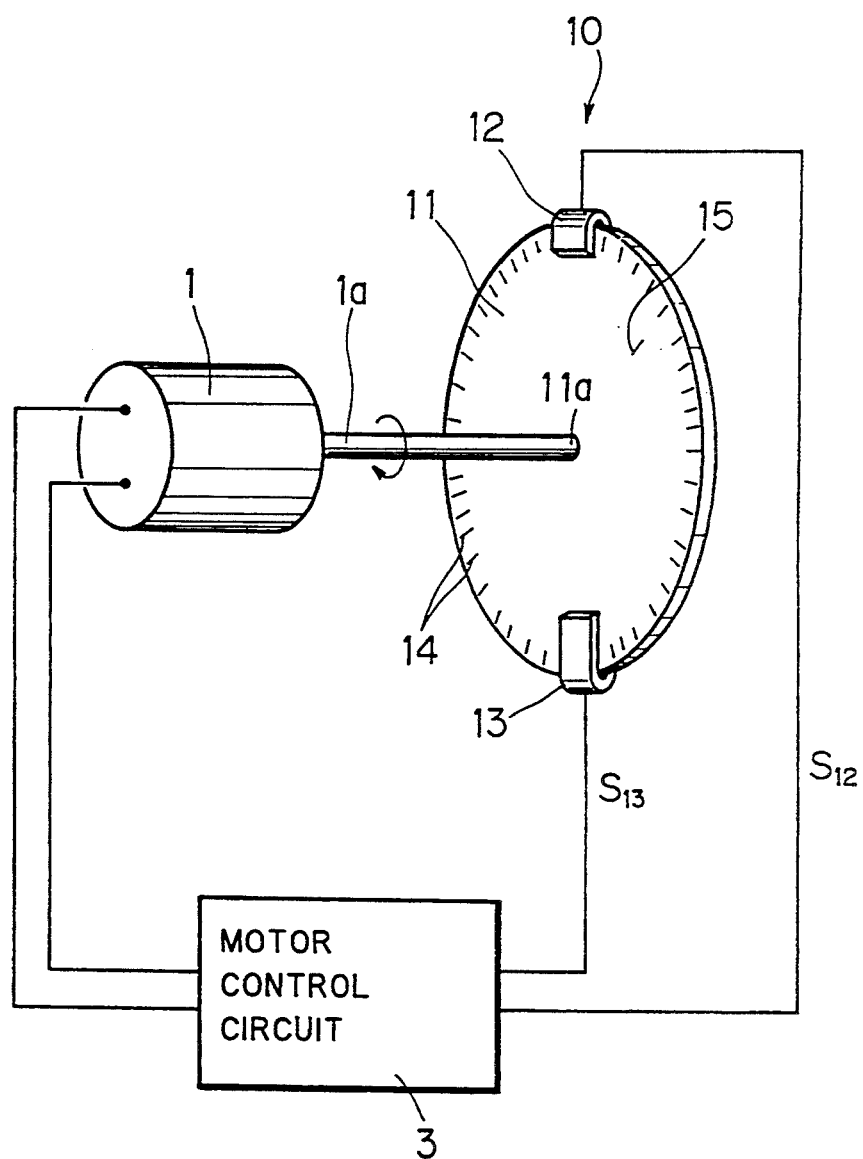
FIG. 1 is a block diagram of a motor control system comprising a rotary encoder.

FIG. 2 is a block diagram of a motor control system employing a detection apparatus according to a first embodiment of the present invention. This system aims at controlling a motor 1 (drive unit) with a rotary shaft 1a extending in a direction parallel to the ground (or, in a direction Z). A detection apparatus 20 detects information about an angular velocity and a rotation angle of the rotary shaft 1a according to which a motor control circuit 3 controls the motor 1. Structural aspects of the detection apparatus 20 are as follows.

A disk 21 is linked to an end of the rotary shaft 1a so that a normal line to the face thereof is parallel to the rotary shaft 1a; that is, the face of the disk 21 being perpendicular to the ground. To the disk 21, two acceleration sensors 22 and 23 are mounted. The first embodiment is directed to where the two sensors are point symmetrical with respect to a center of rotation 21a. However, the arrangement of the sensors 22 and 23 is not limited to this, but can vary as will be described later.

The acceleration sensors 22 and 23 are both electrically connected to an adder 24 and a subtracter 25 so that analogue signals $S_{22}$ and $S_{23}$ from the sensors 22 and 23 would be delivered to the adder 24 and the subtracter 25 simultaneously. The adder 24 adds the values of the signals $S_{22}$ and $S_{23}$ to obtain an added analogue value $v_+$. The added value $v_+$ is then fed to a first computation circuit 26 such as an analogue computation module where the added value $v_+$ is substituted in a proper equation (given later) in order to find an angular velocity $\omega$ of the rotary shaft 1a. Then, a signal $S\omega$ which includes information about the angular velocity $\omega$ is fed to the motor control circuit 3.

On the other hand, the subtracter 25 similarly receives the signals $S_{22}$ and $S_{23}$ and calculates a subtracted analogue value $v_-$. The subtracted value $v_-$ is then supplied to a second computation circuit 27 such as an analogue computation module. The second computation circuit 27 substitutes the subtracted value $v_-$ in a proper equation, whereby a rotation angle $\theta$ of the rotary shaft 1a is obtained. Following this, a signal $S\theta$ related to the rotation angle $\theta$ is generated and fed to the motor control circuit 3.

The motor control circuit 3 compares the signals $S\omega$ and $S\theta$ with control instructions, or designated values, initially stored therein and decides a control input for controlling the motor 1.

Next, operations of the control system as above will be described. First, control instructions with designated values are supplied to the motor control circuit 3. In response to this, a voltage corresponding to an appropriate control input is supplied to the motor 1 and the motor 1 starts rotating, and hence, the disk 21 linked to the rotary shaft 1a starts rotating. The disk 21 rotates in exactly the same manner as the rotary shaft 1a, i.e., an angular velocity and a rotation angle being the same to those of the rotary shaft 1a.

Figure 3B:
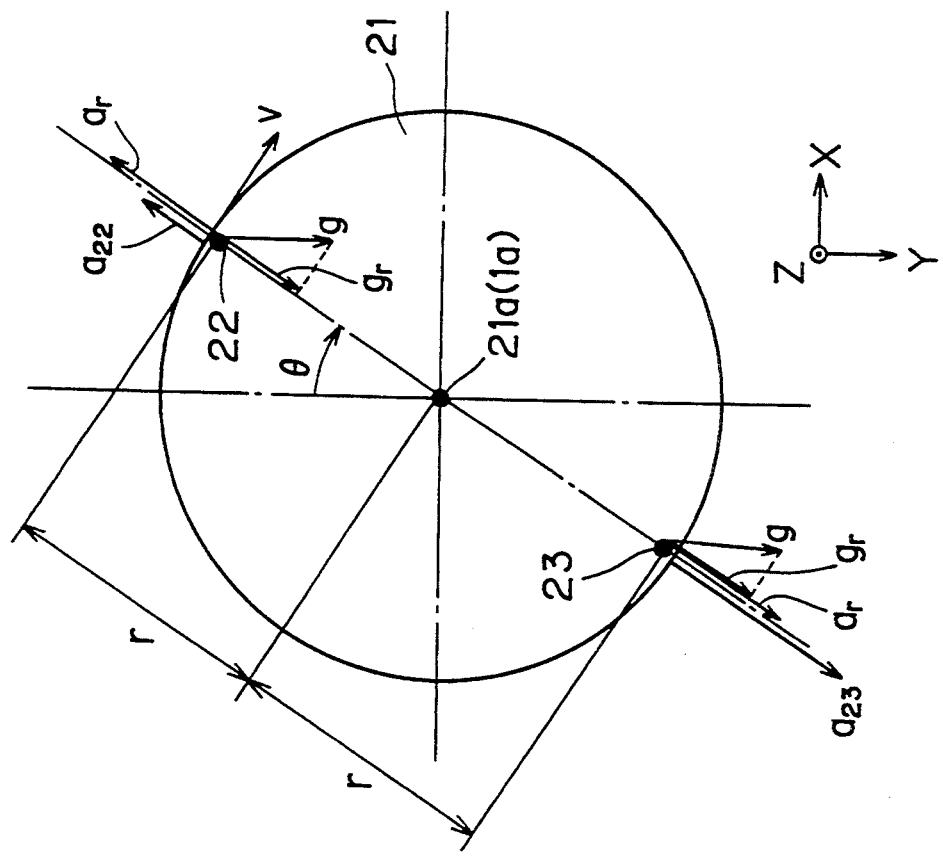
FIGS. 3A and 3B show acceleration acting on acceleration sensors according to a first embodiment of the present invention.
Figure 3A:
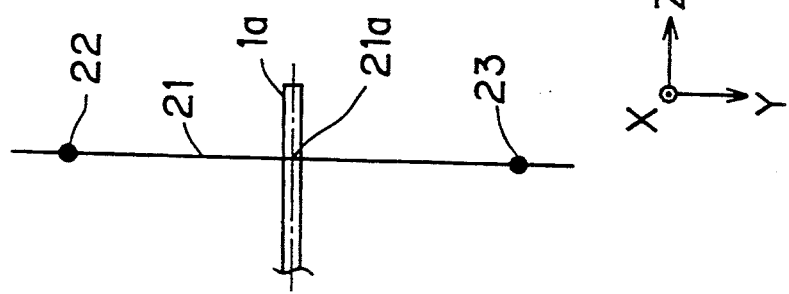

Now, a situation as shown in FIGS. 3A and 3B will be discussed. In FIGS. 3A and 3B, the disk 21 has rotated by an angle $\theta$ from the direction Y of gravitational acceleration g at a tangential velocity v. Forces acting on the acceleration sensors 22 and 23 are centrifugal force and gravity. Hence, accelerations of the sensors 22 and 23 are determined by adding vectors representing an acceleration of centrifugal force and an acceleration of gravity. Specifically, an acceleration $a_{22}$ detected by the acceleration sensor 22 is $$a_{22} = a_r - g_r = a_r - g \cos \theta \qquad (1)$$

where $a_r$ is an acceleration of centrifugal force while $g_r$ is a radial direction component of gravitational acceleration. On the other hand, an acceleration $a_{23}$ detected by the acceleration sensor 23 is $$a_{23} = a_r + g_r = a_r + g \cos \theta \qquad (2)$$

Since the acceleration of centrifugal force a is $$a_r = v^2/r \qquad (3)$$

where r is a distance between the center of rotation 21a (i.e., rotation shaft 1a) and the acceleration sensors 22 and 23, the accelerations $a_{22}$ and $a_{23}$ can be rewritten as below by substituting Eq. 3 in Eqs. 1 and 2.

$$a_{22} = v^2/r - g \cos \theta \qquad (4)$$

$$a_{23} = v^2/r + g \cos \theta \qquad (5)$$

The accelerations $a_{22}$ and $a_{23}$ thus expressed by Eq. 4 and 5 are delivered in the form of the analogue signals $S_{22}$ and $S_{23}$ to both the adder 24 and the subtracter 25. In the adder 24, the added value $v_+$ is given by Eq. 6.

$$v_+ = k \cdot a_{22} + k \cdot a_{23} = 2kv^2/r \qquad (6)$$

where k is a coefficient. The coefficient k is determined by the relationship between accelerations detected by the sensors 22 and 23 and voltages outputted from the sensors 22 and 23. As in Eq. 6, the added value $v_+$ is a function of an acceleration of centrifugal force $a_4$ ($= v^2/r$) alone. Now if an angular velocity of the disk 21 is $\omega$, the following relationship holds.

$$\omega = v/r \qquad (7)$$

Then, substituting Eq. 7 in Eq. 6 yields $$v_+ = 2kr\omega^2 \qquad (8)$$

and solving Eq. 8 for $\omega$, $$\omega = \sqrt{\frac{v_+}{2kr}} \qquad (9)$$

As shown in the above, the angular velocity $\omega$ of the disk 21 (rotary shaft 1a) is obtainable by substituting the value $v_+$ in Eq. 9.

Thus, the adder 24 determines the added value $v_+$ as above and gives a signal including information about the value $v_+$ to the first computation circuit 26. Then, the first computation circuit 16 calculates the angular velocity $\omega$ of the disk 21 (rotation shaft 1a) by Eq. 9. A signal $S\omega$ corresponding to the angular velocity $\omega$ is generated thereafter to be given to the motor control circuit 3.

While the angular velocity $\omega$ is obtained in such a manner, the operation for calculating the rotation angle $\theta$ of the disk 21 (rotation shaft 1a) is proceeding at the same time. First, in the subtracter 25, a subtracted value $v_-$ is calculated as:

$$v_- = k \cdot a_{22} - k \cdot a_{23} = 2kg \cdot \cos\theta \quad \ldots \quad (10)$$

Now rearranging Eq. 10, $$\theta = \cos^{-1}\left(-\frac{v_-}{2kg}\right) \qquad (11)$$

Thus, the rotation angle $\theta$ of the disk 21 (rotary shaft 1a) is obtainable by substituting the subtracted value $v_-$ in Eq. 11. The subtracter 25 calculates the value $v_-$ as above and feeds a signal including information on the value $v_-$ to the second computation circuit 27 where a rotation angle $\theta$ of the disk 21 (rotation shaft 1a) is determined by Eq. 11. Then, a signal $S\theta$ corresponding to the rotation angle $\theta$ is generated to be given to the motor control circuit 3.

The motor control circuit 3 compares the received signals $S\omega$ and $S\theta$ with the control instructions to determine a control input. The obtained control input is then supplied to the motor 1, to thereby maintain the motor 1 in an optimum operation state.

As described in the foregoing, the detection apparatus 20 according to the first embodiment calculates the added value $v_+$ and the subtracted value $v_-$, both of which being an analogue value, from which the angular velocity $\omega$ and the rotation angle $\theta$ of the disk 21 are obtained. As this result, the operation condition (the angular velocity $\omega$ and the rotation angle $\theta$) of the disk 21, i.e., the rotation shaft 1a can be constantly detected with high precision. Owing to such an advantage, the motor control system above employing the detection apparatus 20 exhibits response-improved motor control performance.

Figure 4B:
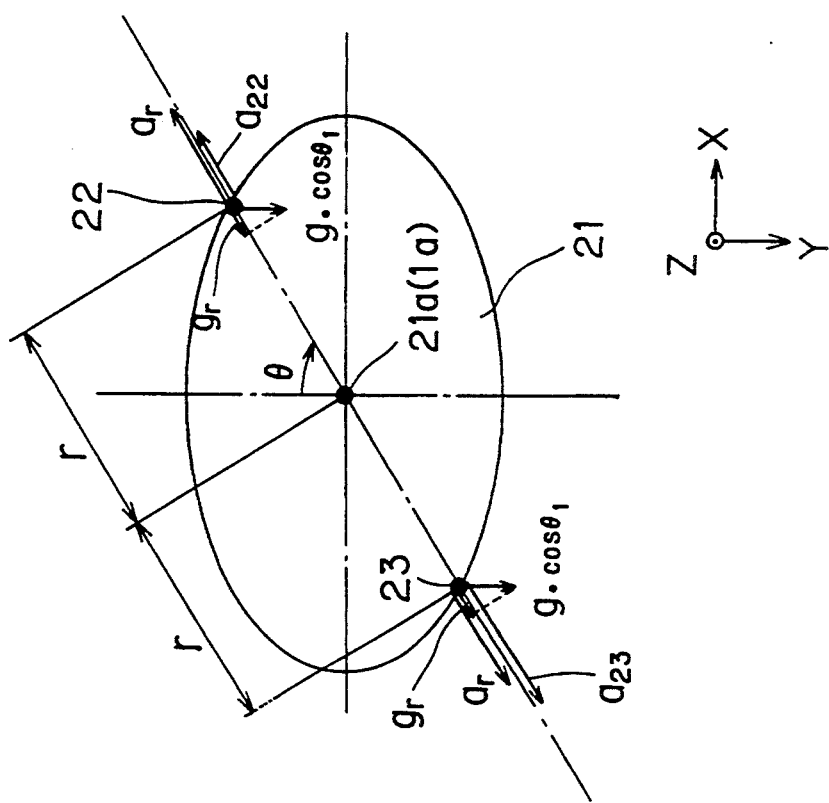
FIGS. 4A and 4B show acceleration acting on acceleration sensors according to a second embodiment of the present invention.
Figure 4A:
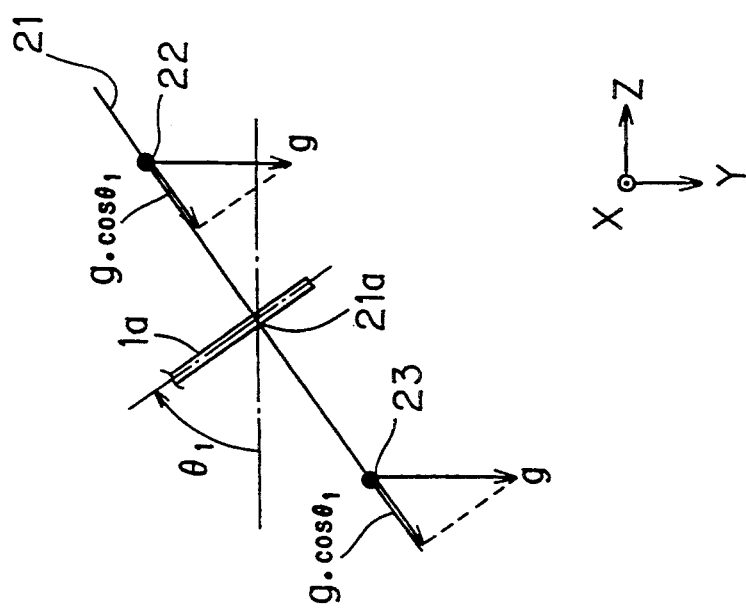

Various modifications of the present invention are possible. First, the face of disk 21 may not be oriented perpendicularly to the ground. FIGS. 4A and 4B show a modified form of the detection apparatus 20 in which the rotation shaft 1a is inclined at an angle of $\theta_1$ to the Z direction. In this case, accelerations $a_{22}$ and $a_{23}$ detected by the acceleration sensors 22 and 23 are $$a_{22} = a_r - g_r \qquad (12)$$
$$= a_r - g \cdot \cos\theta \cdot \cos\theta_1$$

$$a_{23} = a_r + g_r \qquad (13)$$
$$= a_r + g \cdot \cos\theta \cdot \cos\theta_1$$

Analogue signals $S_{22}$ and $S_{23}$ related to the values $a_{22}$ and $a_{23}$ are generated and given to the adder 24 where an added value $v_+$ is found by $$v_+ = k \cdot a_{22} + k \cdot a_{23} = 2kv^2/r \qquad (14)$$

The angular velocity $\omega$ of the disk 21 (rotation shaft 1a) can be then obtained by substituting the added value $v_+$ in Eq. 9, computation manner being the same as the foregoing.

On the other hand, the subtracter 25 receiving the analogue signals $S_{22}$ and $S_{23}$ which correspond to the values $a_{22}$ and $a_{23}$ calculates a subtracted value $v_-$ through subtraction.

$$v_- = k \cdot a_{22} - k \cdot a_{23} \qquad (15)$$
$$= -2kg \cdot \cos\theta \cdot \cos\theta_1$$

and then, $$\theta = \cos^{-1}\left(-\frac{v_-}{2kg\cos\theta_1}\right) \qquad (16)$$

Thus, the rotation angle $\theta$ of the disk 21 (rotation shaft 1a) is found by substituting the value $v_-$ in Eq. 16.

As described in the above, the second embodiment for the case where the face of the disk 21 is not perpendicular to the ground only requires structural changes in the second computation circuit 27, that is, constructing the detection apparatus 20 so that the second computation circuit 27 performs computation according to Eq. 16.

Another embodiment of the present invention will now described with FIGS. 5A and 5B. In FIGS. 5A and 5B, a detecting direction of the acceleration sensors 22 and 23 is inclined at an angle of $\theta_2$ to the direction of radius. As described earlier, an acceleration $a_{22}$ acting on the acceleration sensor 22 is $a_{22}=a_r-g_r=a_r-g\cos\theta$ (Eq. 1). However, an acceleration $a_{22}$ actually detected by the acceleration sensor 22 takes a different value because of the $\theta_2$-degree deviation of the detecting direction.

$$a_{22}' = a_{22} \cdot \cos\theta_2 \qquad (17)$$
$$= a_r \cdot \cos\theta_2 - g \cdot \cos\theta \cdot \cos\theta_2$$

Likewise, an acceleration $a_{23}$ becomes different for the same reason.

$$a_{23}' a_r \cos\theta_2 + g \cdot \cos\theta \cdot \cos a_2 \qquad (18)$$

The adder 24 calculates an added value $v_+$ by adding the values $a_{22}'$ and $a_{23}'$.

$$v_+ = k \cdot a_{22}' + k \cdot a_{23}' \qquad (19)$$
$$= 2k(v^2/r) \cdot \cos\theta_2$$

Rewriting Eq. 19 gives $$\omega = \sqrt{\frac{v_+}{2kr\cos\theta_2}} \qquad (20)$$

Thus, the angular velocity $\omega$ of the disk 21 (rotation shaft 1a) is obtainable by substituting the added value $v_+$ in Eq. 20.

The subtracter 25, on the other hand, calculates a subtracted value $v_-$.

$$\begin{aligned} V_- &= k \cdot a_{22}' - k \cdot a_{23}' \\ &= -2kg \cdot \cos\theta \cdot \cos\theta_2 \end{aligned} \qquad (21)$$

Then, solving for $\theta$, $$\theta = \cos^{-1}\left(-\frac{v_-}{2kg\cos\theta_2}\right) \qquad (22)$$

Thus, a rotation angle $\theta$ of the disk 21 (rotation shaft 1a) is obtainable by substituting the subtracted value $v_-$ in Eq. 22.

As explained in the above, the third embodiment, directed to where the detecting direction of the acceleration sensors 22 and 23 is inclined at an angle of $\theta_2$ to the direction of radius, requires only structural changes in the first and the second computation circuit 26 and 27. That is, required in the third embodiment is to construct the detection apparatus 20 in such a manner that the first and the second computation circuit 26 and 27 perform computation according to Eqs. 20 and 22, respectively.

Figure 6B:
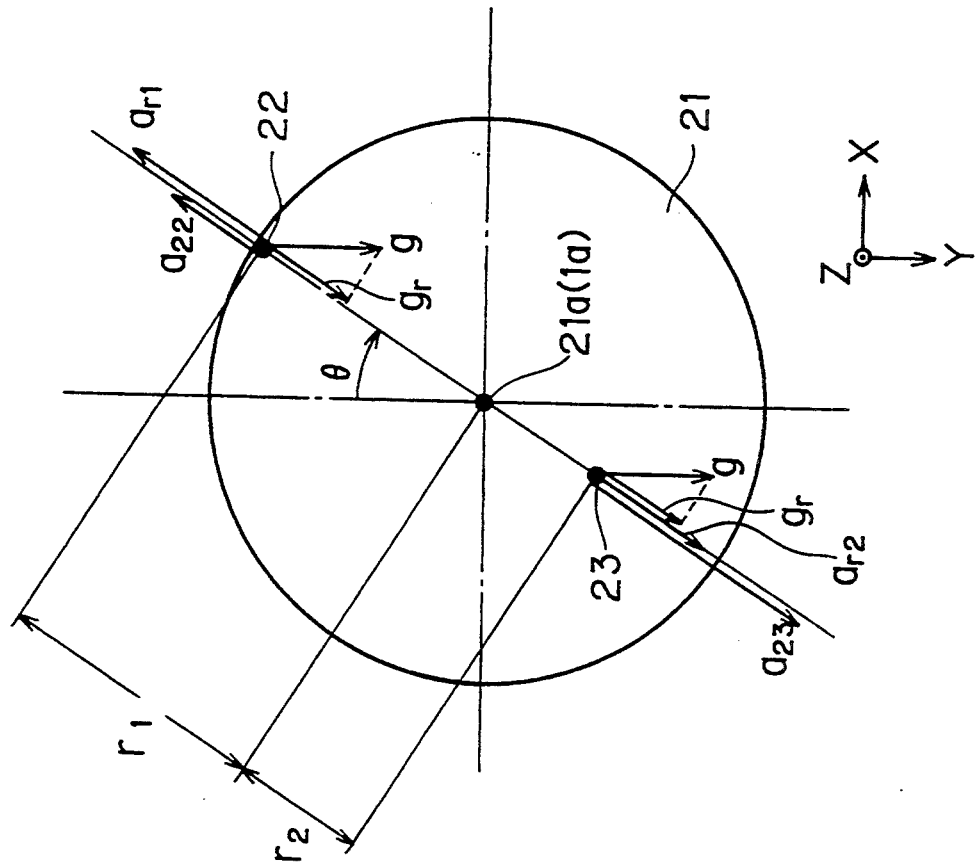
FIGS. 6A and 6B show acceleration acting on acceleration sensors according to a fourth embodiment of the present invention.
Figure 6A:
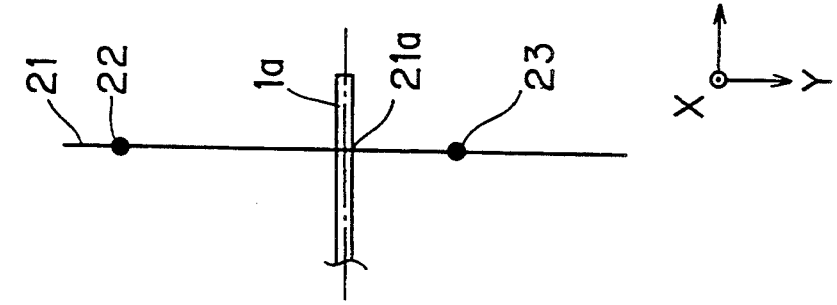

Still another modification is possible as shown in FIGS. 6A and 6B. In FIGS. 6A and 6B, the distance between the center of rotation 21a (that is, rotation shaft 1a) and the sensor 22 is different from the distance between the center of rotation 21a and the sensor 23. Assuming that the distance between the center 21a and the sensor 22 is $r_1$ and the distance between the center 21a and the sensor 23 is $r_2$, accelerations $a_{22}$ and $a_{23}$ actually detected by the sensors 22 and 23 are $$a_{22} = a_{r1} - g_r = a_{r1} - g\cdot\cos\theta \qquad (23)$$

$$a_{23} = a_{r2} + g_r = a_{r2} + g\cdot\cos\theta \qquad (24)$$

where $a_{r1}$ and $a_{r2}$ are accelerations imposed by centrifugal force, the accelerations $a_{r1}$ and $a_{r2}$ acting on the acceleration sensors 22 and 23, respectively. The accelerations $a_{r1}$ and $a_{r2}$ can be written as $$a_{r1} = v_1^2/r_1 \qquad (25)$$

$$a_{r2} = v_2^2/r_2 \qquad (26)$$

where $v_1$ and $v_2$ are tangential velocities of the acceleration sensors 22 and 23. Substituting Eq. 25 in Eq. 23 while substituting Eq. 26 in Eq. 24 gives $$a_{22} = (v^2/r_1) - g\cdot\cos\theta \qquad (27)$$

$$a_{23} = (v^2/r_2) + g\cdot\cos\theta \qquad (28)$$

On the other hand, the angular velocity $\omega$ of the disk 21 can be written as below by using the tangential velocities $v_1$ and $v_2$ and the distances $r_1$ and $r_2$.

$$\omega = v_1/r_1 = v_2/r_2 \qquad (29)$$

Hence, substituting Eq. 29 in Eqs. 27 and 28, $$a_{22} = \omega^2 r_1 - g\cdot\cos\theta \qquad (30)$$

$$a_{23} = \omega^2 r_2 + g\cdot\cos\theta \qquad (31)$$

Then, in the adder 24, the accelerations $a_{22}$ and $a_{23}$ are added together, $$\begin{aligned} v_+ &= k \cdot a_{22} + k \cdot a_{23} \\ &= k\omega^2(r_1 + r_2) \end{aligned} \qquad (32)$$

If solved for $\omega$, $$\omega = \sqrt{\frac{v_+}{k(r_1 + r_2)}} \qquad (33)$$

Thus, the angular velocity $\omega$ of the disk 21 (rotation shaft 1a) is found by substituting the added value $v_+$ in Eq. 33.

While at the same time, the subtracter 25 calculates a difference between the values $a_{22}$ and $a_{23}$ by $$\begin{aligned} v_- &= k \cdot a_{22} - k \cdot a_{23} \\ &= -g(k_1 + k_2)\cdot\cos\theta \end{aligned} \qquad (34)$$

where coefficients $k_1$ and $k_2$ are in the relationship $k_2 = (r_1/r_2)k_1$. And then, $$\theta = \cos^{-1}\left(-\frac{v_-}{g(k_1 + k_2)}\right) \qquad (35)$$

Thus, the rotation angle $\theta$ of the disk 21 (rotation shaft 1a) is found by substituting the subtracted value $v_-$ in Eq. 35.

As explained in the above, only structural changes in the subtracter 25 and the first and the second computation circuit 26 and 27 are required when the distances $r_1$ and $r_2$ are different. In other words, what is necessary is to construct the detection apparatus 20 such that the subtracter 25 performs computation according to Eq. 34 and the first and the second computation circuits 26 and 27 according to Eqs. 33 and 35, respectively.

Figure 7B:
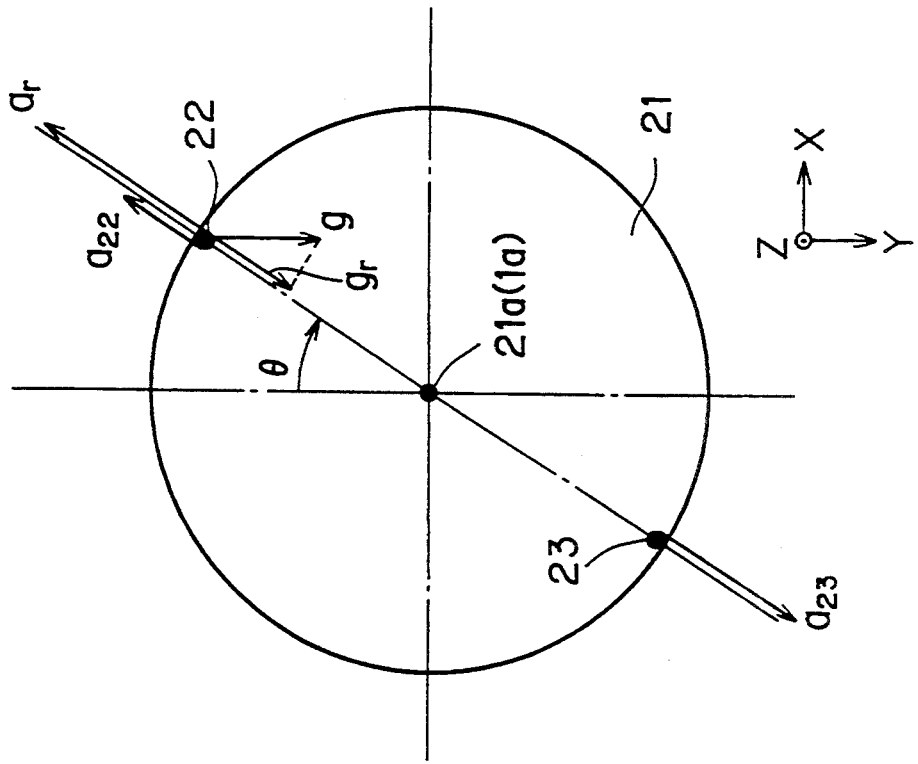
FIGS. 7A and 7B show acceleration acting on acceleration sensors according to a fifth embodiment of the present invention.
Figure 7A:
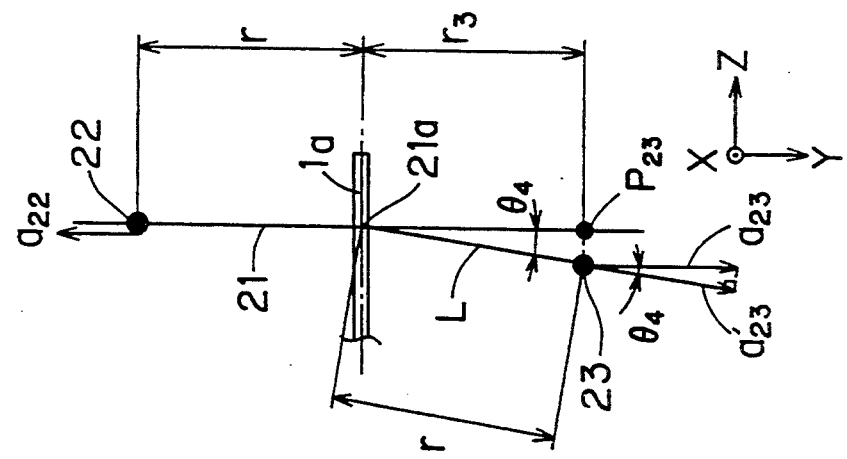

Next, still another embodiment where the sensor 23 is not provided on the disk 21 will be explained while referring to FIGS. 7A and 7B. In FIG. 7A, the acceleration sensor 23 is so mounted that a straight line L drawn from the same to the center of rotation 21a is inclined at angle of $\theta$ to the face of the disk 21. The sensors 22 and 23 are displaced equidistantly from the center 21a by a distance r. Assuming from the foregoing, an acceleration $a_{22}$ detected by the sensor 22 is found by Eq. 4. An acceleration $a_{23}'$ detected by the sensor 23 is given by $$a_{23}' = a_{23}\cdot\cos\theta_4 \qquad (36)$$

where $a_{23}$ is a hypothetical acceleration at a point $P_{23}$ at which a projection image of the sensor 23 upon the disk 21 is located. The acceleration $a_{23}$ is found in a manner described earlier as:

$$a_{23}' = a_{r3} + g \cdot \cos \theta \qquad (37)$$
$$= v_3^2/r_3 + g \cdot \cos \theta$$

where $v_3$ is a tangential velocity at the point $P_{23}'$. Combining Eqs. 36 and 37 gives $$a_{23}' = (v_3^2/r_3 + g \cdot \cos \theta) \cos \theta_4 \qquad (38)$$

On the other hand, the angular velocity $\omega$ can be written as follows by using the tangential velocities $v$ and $v_3$ and the distances $r$ and $r_3$.

$$\omega = v/r = v_3/r_3 \qquad (39)$$

Then, substituting Eq. 39 in Eqs. 4 and 38 yields $$a_{22} = \omega^2 r - g \cdot \cos \theta \qquad (40)$$

$$a_{23}' = \omega^2 r_3 \cdot \cos \theta_4 + g \cdot \cos \theta \cdot \cos \theta_4 \qquad (41)$$

The adder 24 adds the values $a_{22}$ and $a_{23}'$ to obtain an added value $v_+$ as follows:

$$v_+ = k_3 \cdot a_{22} + k_4 \cdot a_{23}' \qquad (42)$$
$$= k_3 \omega^2 r (1 + \cos \theta_4)$$

where coefficients $k_3$ and $k_4$ are $k_4 = k_3/\cos \theta_4$. If solved for $\omega$, Eq. 42 becomes $$\omega = \sqrt{\frac{v_+}{k_3 r (1 + \cos \theta_4)}} \qquad (43)$$

Thus, the angular velocity $\omega$ of the disk 21 (rotation shaft 1a) is obtainable by substituting the added value $v_+$ in Eq. 43.

On the other hand, the subtracter 25 determines a difference between the accelerations $a_{22}$ and $a_{23}'$ by $$v_- = k_3 \cdot a_{22} - k_5 \cdot a_{23}' \qquad (44)$$
$$= -g k_3 \cdot \cos \theta \cdot (1 + 1/\cos \theta_4)$$

where $k_5$ is a coefficient and $k_5 = k_3/\cos^2 \theta_4$. And then, $$\theta = \cos^{-1}\left\{ -\frac{v_-}{g k_3 \left(1 + \frac{1}{\cos \theta_4}\right)} \right\} \qquad (45)$$

Thus, the rotation angle $\theta$ of the disk 21 (rotation shaft 1a) is found by substitution of the subtracted value $v_-$ into Eq. 45.

From the above discussion, it is understood that structural modification in the adder 24, the subtracter 25 and the first and the second computation circuits 26 and 27 is necessary when the acceleration sensors 22 and 23 are not mounted in the same plane. In short, it is required in the detection apparatus 20 that the adder 24 performs computation according to Eq. 42 and the subtracter 25 according to Eq. 44 while the first and the second computation circuits 26 and 27 according to Eqs. 43 and 45, respectively.

The foregoing has shown that the rotation angle $\theta$ is found by Eq. 11 (or by Eqs. 16, 22, 35 and 45). For actual use, therefore, the rotation angle $\theta$ must be in the range from 0° to 180°. Let the range of the rotation angle $\theta$ be from −180° to 180°, or one rotation, for example. Then, the solution of Eq. 11 or the other corresponding equations would be "$\theta$" and "$-\theta$," presenting confusion that a true solution cannot be determined.

Figure 8:
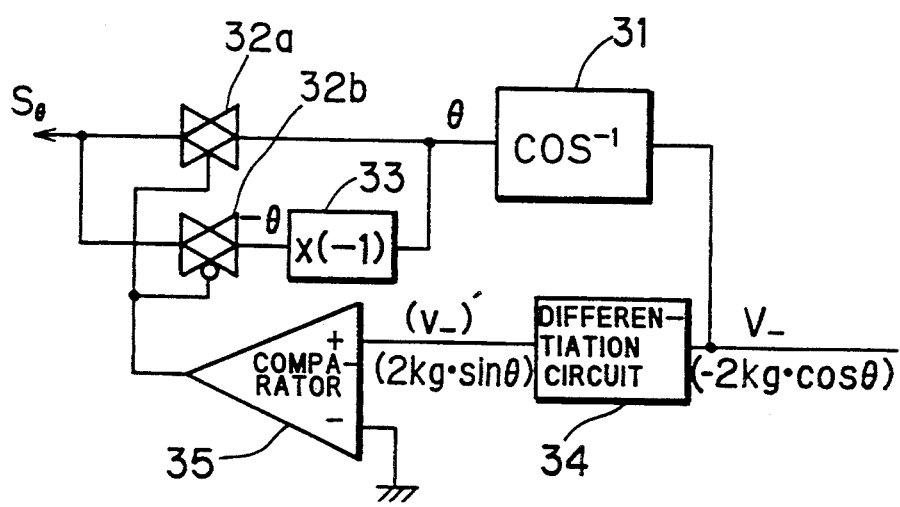
FIG. 8 is a block diagram of an improved second computation circuit 27 according to the present invention.

This can be easily solved by introducing some improvement in the detection apparatus 20 heretofore described. FIG. 8 is a block diagram of a second computation circuit 27 according to an improved embodiment. As FIG. 8 shows, a signal related to a subtracted value $v_-$ is generated to be supplied to a computation circuit 31. The subtracted value $v_-$ is assumed as $v_- = -2kg \cdot \cos \theta$ here.

The computation circuit 31 performs computation according to Eq. 11 and feeds the result $\theta$ to both a switch 32a and a computation circuit 33. Provided with the value $\theta$, the computation circuit 33 determines a value to be fed to another switch 32b by $$\theta = -\theta \qquad (46)$$

and supplies the result $-\theta$ to the switch 32b.

The signal related to the subtracted value $v_-$ is supplied also to a differentiation circuit 34 where the value $v_-$ is differentiated to become $2kg \cdot \sin \theta$. The value $2kg \cdot \sin \theta$ is then delivered to a comparator 35 at the plus terminal thereof. Then, the comparator 35 having the minus terminal with grounded connection determines whether or not the value $2kg \cdot \sin \theta$ is greater than zero. The comparator 35 outputs an "H" level signal if the value $2kg \cdot \sin \theta$ is bigger than zero whereas it outputs an "L" level signal if the value is smaller than zero. The generated signal is given to both the switch 32a and the switch 32b. This allows either one of the switches 32a and 32b to turn on. In more particular words, only the switch 32a would be turned on when the signal from the comparator 35 is the "H" level, so that the signal $\theta$ would be supplied from the computation circuit 31 to the motor control circuit 3 (FIG. 2). In contrast, only the switch 32b would be turned on when the signal is the "L" level, feeding the signal $-\theta$ into the motor control circuit 3.

Thus, owing to the improvement, the need of limiting the range of the rotation angle $\theta$ is eliminated because a true rotation angle is found from a result of differential calculus of the subtracted value $v_-$. Hence, accurate calculation of a rotation angle is always secured.

In utilizing the improvement above, integral calculus can be used in lieu of differential calculus to find a true rotation angle. In addition, the differentiation circuit 34 may be substituted by other suitable element. For instance, an acceleration sensor which detects an acceleration of a direction tangential to the disk 21. The acceleration sensor generates a signal related to $\sin \theta$ and supplies it to the comparator 35 in such a case.

Figure 9:
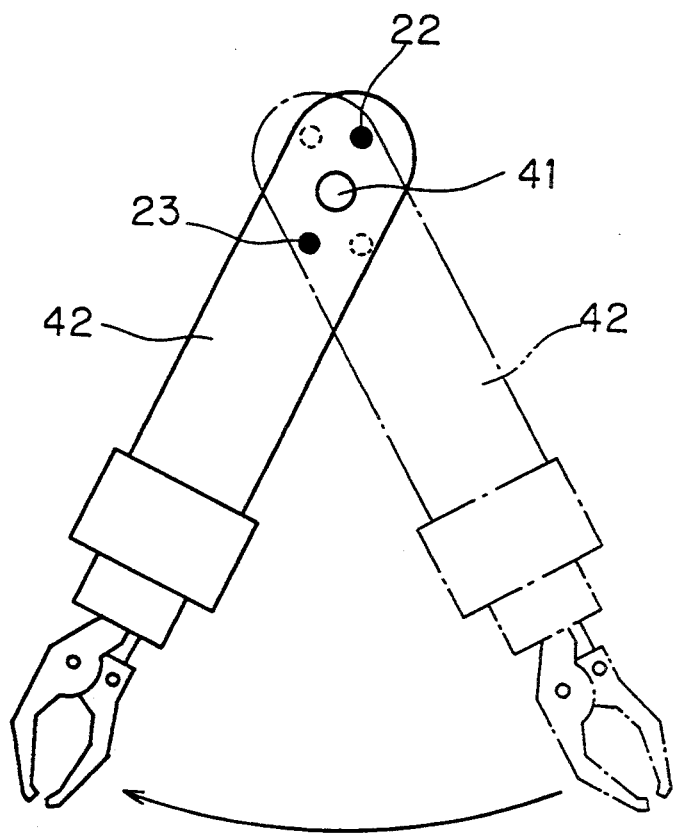
FIG. 9 is a block diagram illustrating still another embodiment of the present invention.

The foregoing has described a method of and an apparatus for detecting an angular velocity and a rotation angle of the rotation shaft 1a of the motor 1. The present invention, however, is not limited to a rotation shaft of a motor alone, but has a broader applicable field. FIG. 9 illustrates the case where the present invention is utilized to detect an angular velocity and a rotation angle of a robot arm 42 which rotates about a shaft 41. In this variation, acceleration sensors 22 and 23 may be mounted directly to the robot arm 42. The adder 24, the subtracter 25 and the first and the second computation circuits 26 and 27 are modified according to how the sensors 22 and 23 are mounted, and an angular velocity $\omega$ and a rotation angle $\theta$ of the robot arm 42 can be found.

Although all the embodiments above deal with the case where both an angular velocity and a rotation angle of an object such as a rotation shaft and a robot arm are simultaneously found, only an angular velocity or a rotation angle may be desired to be detected. If only an angular velocity $\omega$ is wanted, for example, the subtracter 25 and the second computation circuit 27 are not necessary.

I claim:

1. A method of detecting an angular velocity of a rotary member and for controlling a motor, comprising the steps of:
   detecting first and second accelerations at first and second points of said rotary member, respectively;
   adding said first and second accelerations to obtain an added value;
   calculating an angular velocity of said rotary member on the basis of said added value;
   generating a first signal representing said angular velocity;
   comparing said first signal with predetermined control instructions;
   generating a first control input based on said comparing step; and
   controlling a motor disposed to drive said rotary member based upon said first control input.

2. A method in accordance with claim 1, wherein said first and second points are symmetrical with respect to a rotation center of said rotary member and are provided on a surface of said rotary member.

3. A method in accordance with claim 2, wherein said angular velocity $\omega$ of said rotary member is calculated using the following equation:

$$\omega = \sqrt{\frac{v_+}{2kr}}$$

where $v_+$ is said added value, k is a coefficient, and r is a distance between said rotation center and either one of said first and second points.

4. A method in accordance with claim 2, wherein a detecting direction of said first and second accelerations is inclined at an angle of $\theta_2$ with respect to a straight line drawn from said rotation center to either one of said first and second points.

5. A method in accordance with claim 4, wherein said angular velocity $\omega$ of said rotary member is calculated using the following equation:

$$\omega = \sqrt{\frac{v_+}{2kr \cos \theta_2}}$$

where $v_+$ is said added value, k is a coefficient, and r is a distance between said rotation center and either one of said first and second points.

6. A method in accordance with claim 1, wherein a distance $r_1$ between said first point and a rotation center of said rotary member is different from a distance $r_2$ between said second point and said rotation center while said first point, said rotation center and said second point being aligned in this order.

7. The method in accordance with claim 6, wherein said angular velocity $\omega$ of said rotary member is calculated using the following equation:

$$\omega = \sqrt{\frac{v_+}{k(r_1 + r_2)}}$$

where $v_+$ is said added value, k is a coefficient, and r is a distance between said rotation center and said first and second points.

8. A method in accordance with claim 1, wherein said first point is provided on a surface of said rotary member while said second point is so located that a straight line drawn from said second point to said rotation center is inclined at an angle of $\theta_4$ to said surface.

9. A method in accordance with claim 8, wherein said angular velocity $\omega$ of said rotary member is calculated using the following equation:

$$\omega = \sqrt{\frac{v_+}{k_3 r(1 + \cos \theta_4)}}$$

where $v_+$ is said added value, $k_3$ is a coefficient, and r is a distance between said rotation center and said first point.

10. An apparatus for detecting angular velocity and for controlling a motor comprising:
   a rotary member;
   a motor for driving said rotary member;
   first and second sensors for detecting first and second accelerations at first and second points of said rotary member, respectively;
   an adder for adding said first and second accelerations to obtain an added value;
   a first computation unit for calculating an angular velocity of said rotary member on the basis of said added value and for outputting a first signal representing said angular velocity; and
   a motor control unit for comparing said first signal with control instructions previously stored therein, generating a first control input, and controlling said motor on the basis of said control input.

* * * * *